United States Patent [19]

Saperstein

[11] 4,377,024
[45] Mar. 22, 1983

[54] METHOD OF MAKING A HEAT EXCHANGER

[75] Inventor: Zalman P. Saperstein, Gurnee, Ill.

[73] Assignee: Modine Manufacturing Company, Racine, Wis.

[21] Appl. No.: 250,111

[22] Filed: Apr. 2, 1981

[51] Int. Cl.³ ............... B23P 15/26; B23K 31/02
[52] U.S. Cl. ................... 29/157.3 C; 228/183; 228/180 R
[58] Field of Search ............ 228/183, 190, 180 R; 29/157.3 C

[56] References Cited

U.S. PATENT DOCUMENTS 3,769,675 11/1973 Chartet .............................. 228/183
3,941,293 3/1976 Chartet .............................. 228/183

Primary Examiner—Francis S. Husar
Assistant Examiner—V. K. Rising
Attorney, Agent, or Firm—Wegner, McCord, Wood & Dalton

[57] ABSTRACT

A method of making a heat exchanger of the type used in vehicle radiators and having a core of spaced welded, as contrasted to lock-seam, tubes and interconnecting fins connected to spaced liquid tanks. The method, which permits machine-operated mass production of these exchangers, comprises stacking solder-coated core tubes in vertically spaced sets of a plurality of essentially horizontal tubes with serpentine fins located between each vertical pair of tube sets, arranging a top and a bottom rigid support plate against each of the topmost and bottommost tube sets, applying compression to the resulting stack through the support plates, banding the stack into an easily handled rigid assembly, applying a header plate to each essentially vertical side of the assembly with the tube ends extending through corresponding holes in the header plates, gang welding the projecting ends of the tubes to the exterior of the respective header plates by means of a movable multi-head automatic welder, dipping this core assembly into a liquid soldering flux dip, blowing heated air at a temperature above the melting point of the solder over the outer surfaces of the core assembly to bond the fins to the tubes, applying a solder sealant coating over the adjacent junction areas of tubes and header plates that are opposite to the welds, the welds thereby being on the liquid side and the solder on the air side and finally removing the support plates and bands from the core and attaching the enclosing tanks to the header plates in fluid tight relation.

8 Claims, 10 Drawing Figures

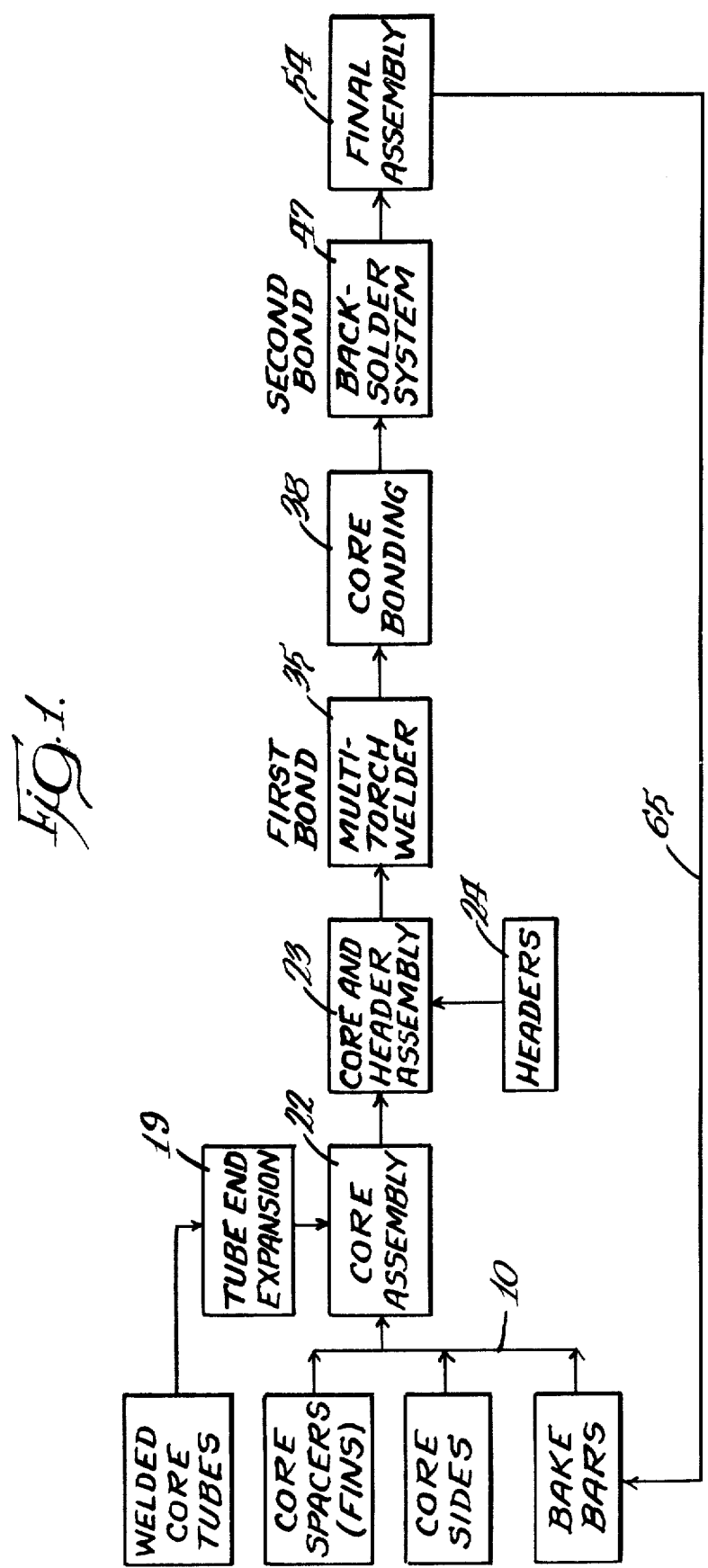

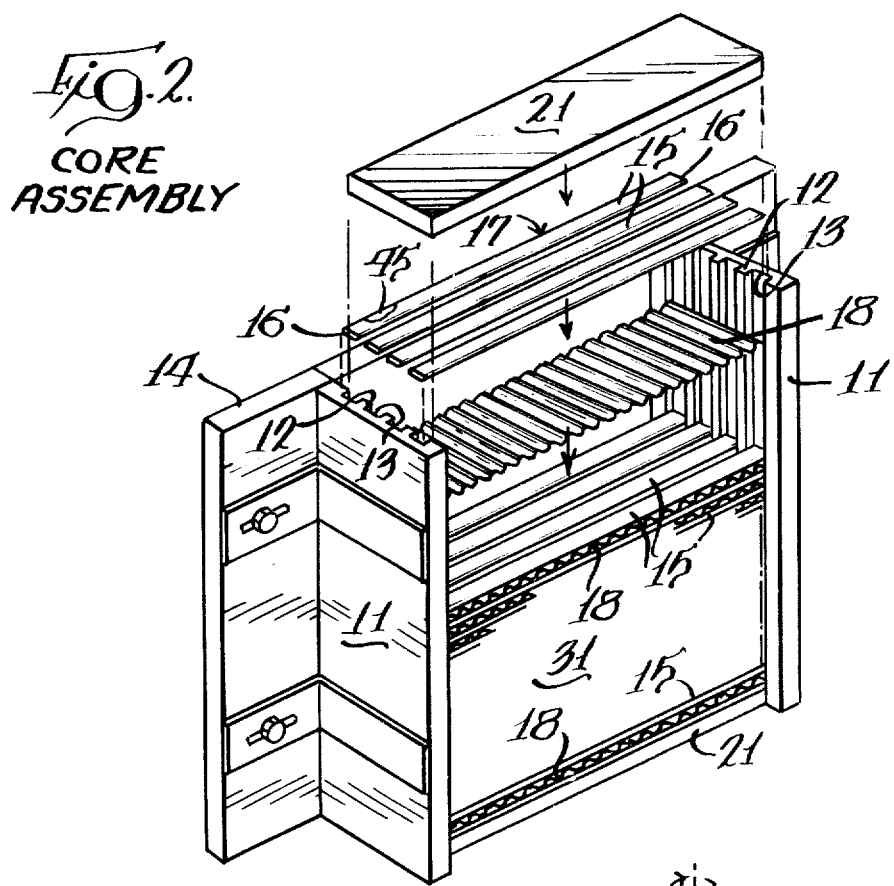
Fig. 2. CORE ASSEMBLY
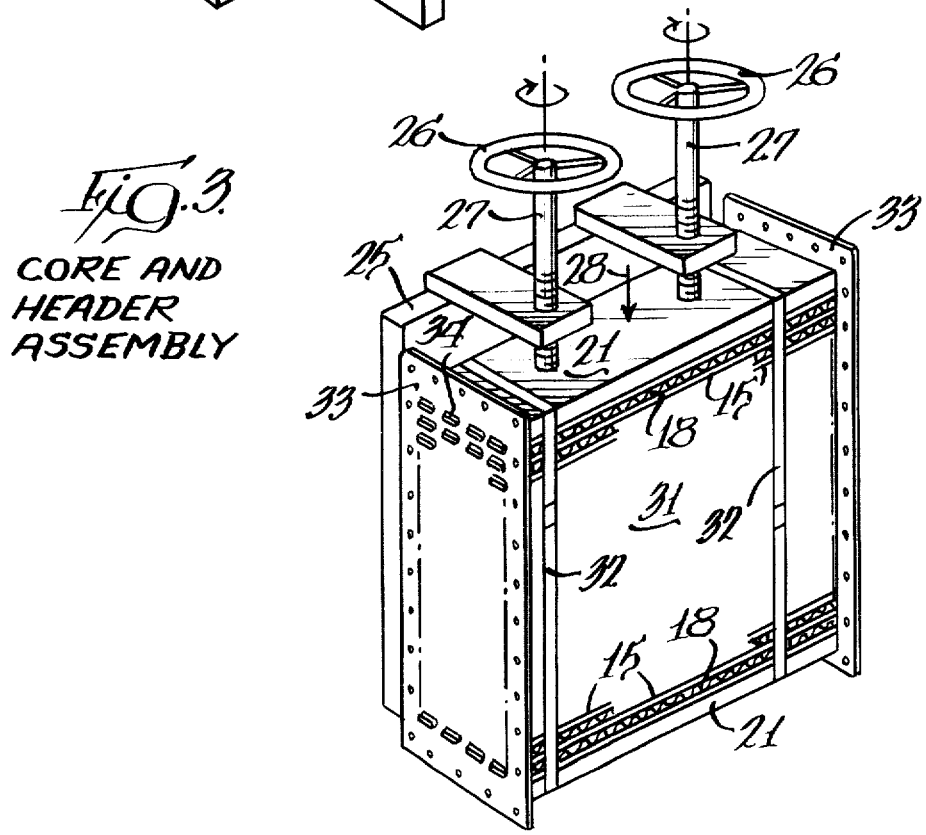
Fig. 3. CORE AND HEADER ASSEMBLY

MULTI-TORCH WELDING

CORE TO FIN BONDING

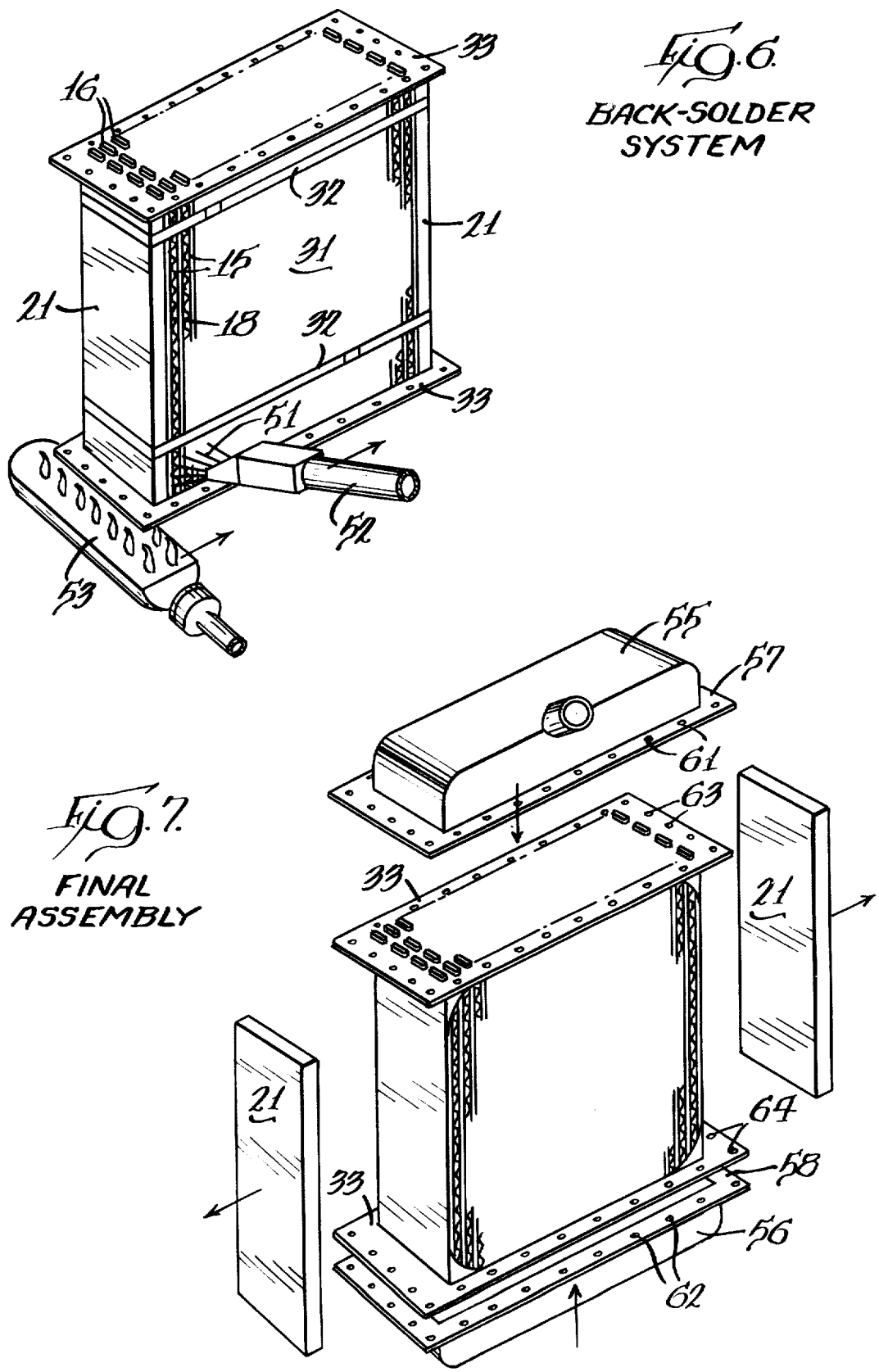

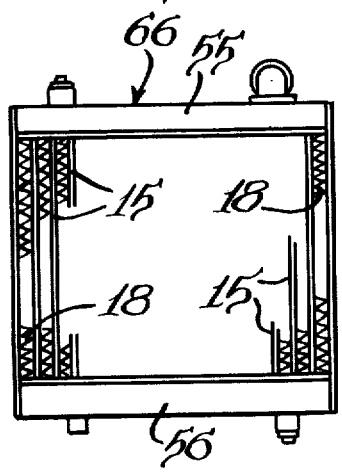
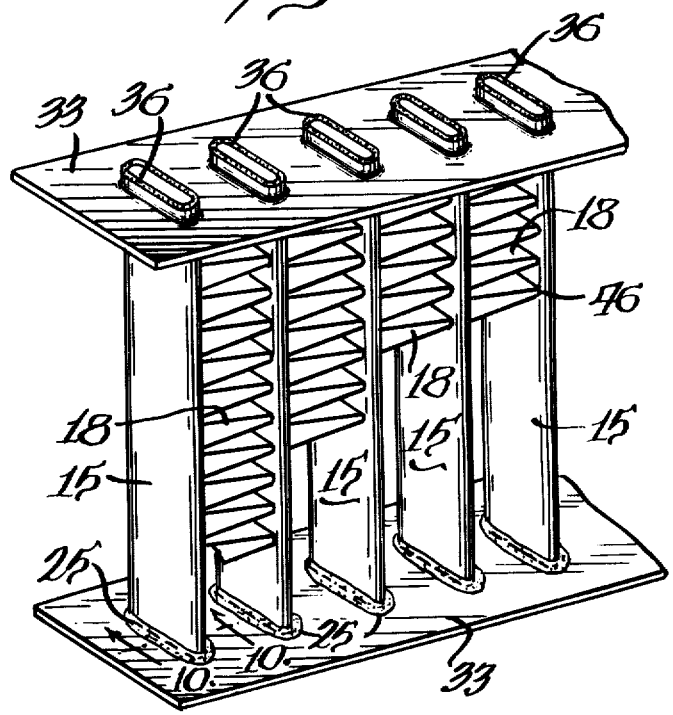
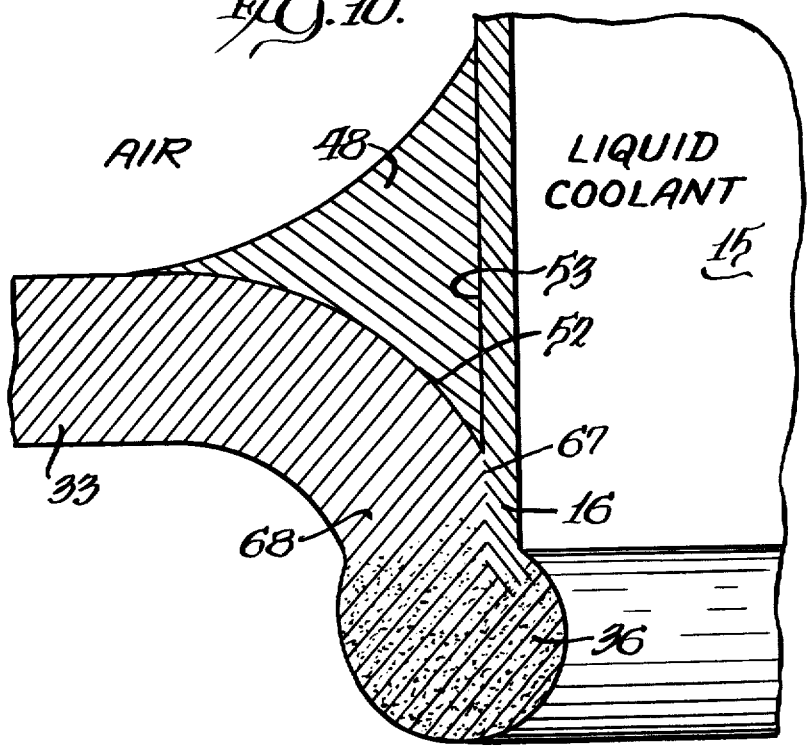

4,377,024

METHOD OF MAKING A HEAT EXCHANGER

BACKGROUND OF THE INVENTION

Heat exchangers of the liquid-air type used in automotive vehicle cooling systems, air conditioning systems and the like, involve considerable labor to produce. Where automatic machinery is used to produce the exchanger, especially where weldment construction is employed at the joints uniting the parts, there is frequently a large percentage of rejects because of pinholes, fissures and other leakage openings in one or more of the weldment joints. Even one such leakage opening results in rejecting the exchanger. Such an opening is ordinarily difficult to locate and laborious and expensive to correct.

The method of this invention permits the step-by-step mass production of heat exchangers and avoids substantially entirely the leakage problem by providing a sealant coating of solder over the air side of the welds which are themselves on the liquid side. In addition, any leakage is from the liquid interior of the heat exchanger to the outer air side so that its detection and correction are easily accomplished.

The invention will be described in one embodiment thereof as illustrated in the accompanying drawings.

BRIEF DESCRIPTION OF THE DRAWINGS

FIG. 1 is a flow chart illustrating the successive steps in the mass production method of this invention;

FIG. 2 is a schematic exploded perspective view of an initial step in making the core assembly;

FIG. 3 is a schematic perspective view illustrating the next step in the method;

FIG. 6 is a schematic fragmentary perspective view illustrating the applying of the sealant solder which functions as a second bond;

FIG. 7 is an exploded schematic perspective view illustrating the final assembly of the heat exchanger;

FIG. 8 is a schematic front elevational view, partially broken away, of a completed heat exchanger produced according to the method of the invention;

FIG. 9 is a schematic fragmentary perspective view of a partially complete heat exchanger manufactured by the method of this invention;

FIG. 10 is an enlarged fragmentary schematic sectional view taken substantially along line 10—10 of FIG. 9.

BRIEF DESCRIPTION OF THE ILLUSTRATED EMBODIMENT

Figure 4:
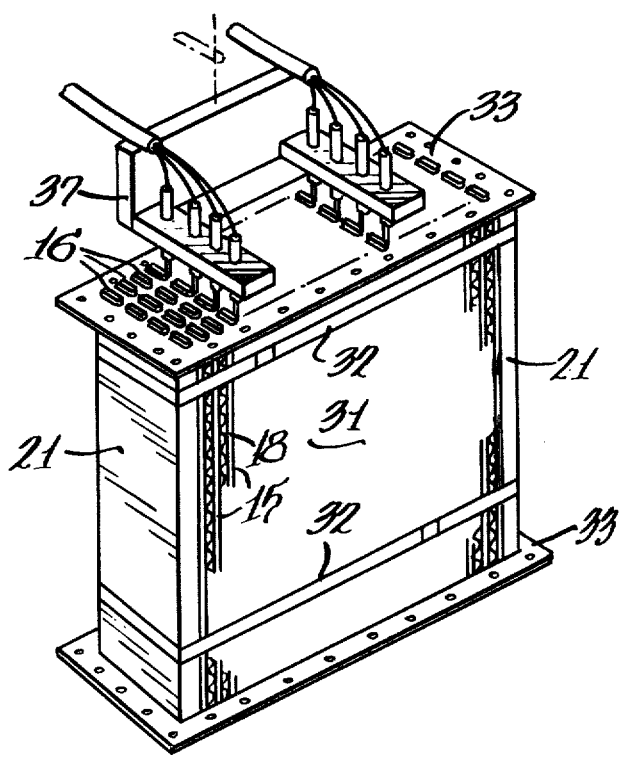
FIG. 4 is a similar schematic perspective view illustrating the gang welding of the projecting ends of the tubes to a header plate.

FIG. 1 illustrates the flow chart for mass producing the heat exchangers illustrated at FIGS. 8, 9 and 10 according to the methods of this invention in which the important steps are illustrated in the successive FIGS. 2-7, inclusive.

As illustrated by the flow chart of FIG. 1, the welded core tubes, core spacers or fins, core sides or rigid support plates, grooved side assembly plates and bake bars or rigid support plates are arranged at the beginning 10 of the parts flow as illustrated in FIG. 1. In an initial step 19, the ends 16 of the welded tubes are expanded so as to fit snugly in holes 67 in the header plates 33 and to prevent inward distortion during welding of the tube ends to the header plates.

A core assembly is then produced as illustrated in FIG. 2 in which a core assembly fixture has sides in the form of parallel plates with confronting surfaces 12 that are provided with spaced vertical grooves 13. These side plates 11 are held in an adjustable bracket 14 and are spaced apart a distance equivalent to the spacing of the header plates in the heat exchanger.

In making the core assembly, coplanar sets of solder-coated tubes 15 are arranged between the side plates 11 with the ends 16 of tubes held for movement in the grooves 13. In the illustrated embodiment, there are four of the tubes 15 to a set and these tubes are the customary flat or oval cross-section structure.

Arranged between each set of tubes 17 is a spacer here shown as a serpentine fin 18. As can be seen from FIG. 2, the core assembly comprises a series of alternate sets 17 of tubes and intervening fins 18.

The top and bottom of the core assembly are each provided with a "bake bar" 21 which operate as top and bottom rigid support plates. These bake bars are movable relative to and extend between the side surfaces 12 of the plates 11. The method step of FIG. 2 is illustrated in the flow chart of FIG. 1 at 22.

In the next step, as illustrated at 23 and 24 and shown in detail in FIG. 3, the assembly of FIG. 2 is held in a bracket 25 that is provided with pressure screws 27. These screws engage the tube support plate 21 to apply pressure thereto as illustrated by the arrow 28. This pressure compresses the assembly of plates 21 and sets 17 of tubes with intervening fins 18 into tight contact. While so held, the stack 31 is banded into an easily handled rigid assembly by applying a plurality, here shown as two, of spaced, taut metal tie bands 32 around the stack including the support plates 21 and encircling the stack as shown in FIG. 3.

As a part of the production of the assembly shown in FIG. 3 and illustrated at 24 in FIG. 1, the header plates 33 are forced over the projecting ends 16 of the solder-coated welded tubes 15 by causing these ends to project through similarly shaped openings 34 in these plates.

The resulting assembly which now includes the header plates 33 is moved to the next station 35 of the assembly method where the first bond or weld joint is made uniting each tube end to each header plate. At this station 35 where the first bond weld 36 is applied on what will become the liquid side of the head exchanger, there is provided a gang welding multitorch welder 37. As is illustrated in FIG. 4, this welder welds eight tube ends 16 simultaneously to the corresponding header plate 33 and as is customary with this type of equipment, the welding is automatically controlled.

Figure 5:
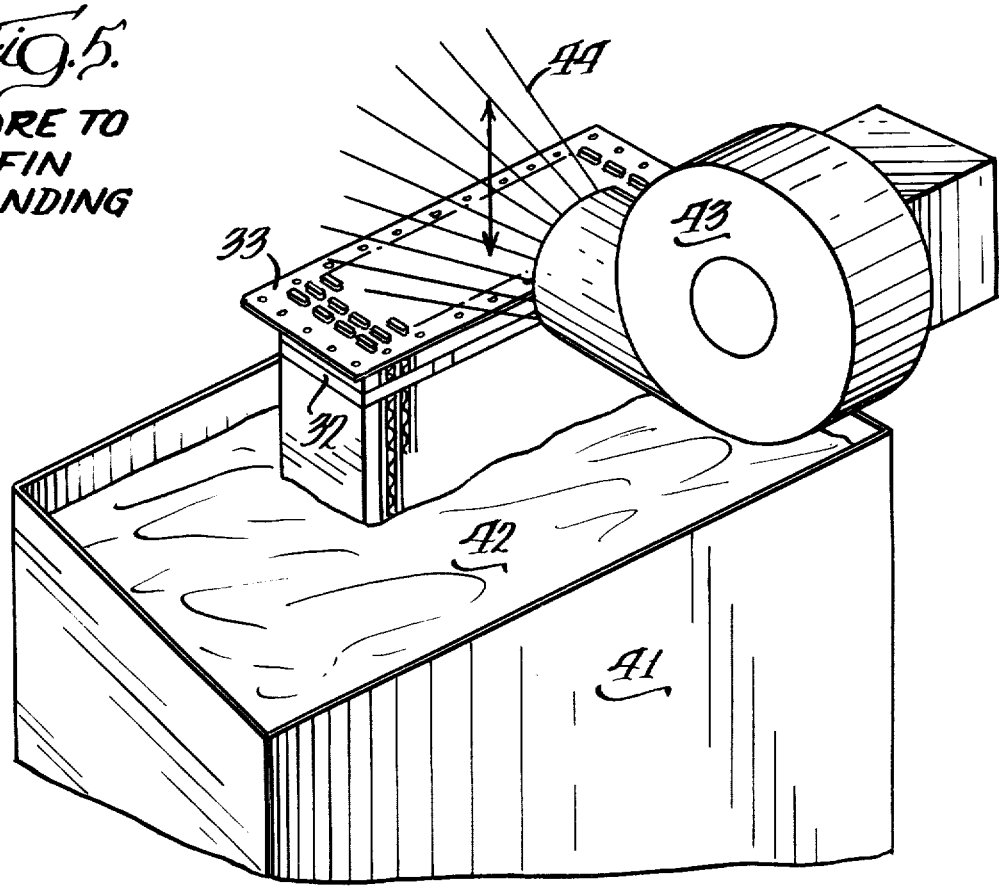
FIG. 5 is a schematic fragmentary perspective view illustrating one embodiment of uniting the tubes of the core to the intermediate fins which serve as spacers.

In the next station of the process, as illustrated at 38 in FIG. 1 and at FIG. 5, the core assembly from FIG. 4 with the tube ends welded to the header plates 33 is dipped into a tank 41 of liquid solder flux 42 of a customary type and then withdrawn from this solder flux bath 42 past the exhaust of a hot air blower 43 whose hot air exhaust 44 is at a temperature above the melting point of the solder, illustrated at 45 in FIG. 2, coating on the tubes 15. This core bonding at station 38, as illustrated at FIG. 5, unites the fins 18 at their crests 46 to the flat sides of the tubes 15.

At the next station 47, shown schematically in FIG. 1, the second bond or back soldering of the welds 36 is applied. Here, as is illustrated in FIG. 6, the air side solder sealant 48 is applied. In the illustrated embodiment, this is accomplished by blowing a flowing mixture 51 of powdered solder and flux over the adjacent junction areas of the header plates 33 and tube ends 16 on the air side. This can easily be accomplished by a commercially available blower 52. As can be seen from FIG. 10, the solder sealant or second bond 48 is located on the air side of the exchanger while the welds 36 are on the liquid side. The solder sealant 48 is provided as shown by heating the exterior of each header plate 33 by means of a traversing burner 53 from which heat is conducted through the header plate 33 to the area of the solder 48 where the solder is melted to provide the second bond or solder sealant 48.

At the next station 54 (FIG. 1) of the flow chart of FIG. 1, the final assembly steps occur. Here the upper tank 55 and lower tank 56 are attached. Each of these tanks has a flange 57 and 58 provided with bolt holes 61 and 62 for cooperating with similar bolt holes 63 and 64 at the outer edges of the top and bottom header plates 33. At the same time, the tie bands 32 are removed and the bake bars or support plates 21 are removed and returned to the beginning station as illustrated by the elongated arrow 65 in FIG. 1.

The method of this invention provides a second bond which is the air side solder coating 48 that is useful both in strengthening the unit and also providing a sealant for any small openings that may develop. Welds 36 being located on the liquid side of the heat exchanger leak toward the air side as shown at FIG. 10 if any leaks should occur.

Heat exchangers of this type, particularly thin wall tube weldment type heat exchangers, are difficult to make in commercially desirable high rates of production through the use of production machines because of an undesirably high amount of leakage. The method of this invention permits high speed production of weldment heat exchangers even with thin wall tubes, with practically no leakage openings because the solder sealant is in position to fill any such leakages should they occur. The solder also provides a secondary bond for added strength. Among the metals that can be welded and which are therefore useful in making heat exchangers by the method of this invention are steel, oxygen-free or deoxidized copper, brass and aluminum.

As is shown in detail in FIG. 10, the tube-receiving hole 67 in each header plate 33 is defined by a flange 68 which projects outwardly in that it is turned outwardly from the plane of the plate 33. Each flange 68 and the corresponding tube end held therein have substantially coplanar surfaces before the welding that provides the welds 36. This combination of welds 36 and solder seals 48 results in a heat exchanger 66 that is very strong not only because of the welds but also because of the dual bond construction that comprises the combination of the welds 36 and solder seals 48.

The important points to be kept in mind are that solder joints are well-known to be weak, normally averaging about 10-40 lb/in of solder fillet. Welded brass, on the other hand, is very strong, for example about 30,000-33,000 psi tensile strength. However, there welds are prone to defects caused by zinc fuming, thermal distortion and irregularities, and the solder precoatings on the tubes.

In view of the above properties, a 1.2-inch long solder fillet is capable of sustaining a tensile load of about 12-48 lb. A weldment tube-to-header joint is the same tube (0.5 × 0.096 radiator tube with a 0.006-inch thick tube wall) will sustain a tensile load of about 216-238 lb. or about 4.5 to 20 times more load-carrying ability than the soldered joint. The dual bond of this invention, therefore, is characterized by the weld containing small defects. The solder sealant of the dual bonded joint, however, having excellent capillary flow properties, fills any defects in the welds to provide a leak-tight structure. Thus, the welds provide about 75-95% of the maximum sustainable load while the solder of the dual bond fills any leakage openings and also contributes to the strength of the dual bond combined joint.

Thus, the solder joint is weak and a weld joint is strong, but one without the other is deficient because the soldered joint is not strong enough while the weld joint may leak. A leaky welded joint structure cannot be used without the solder sealant. The two together, therefore, provide high joint strength and a substantial absence of leaks. Actual tests have shown that the combination as described and claimed herein has a structural life at least 5-10 times longer than the conventional soldered heat exchanger where everything else is the same.

I claim:

1. In making a weldment heat exchanger having an air side core of spaced tubes and interconnecting fins extending between liquid tanks, the method comprising:
   (a) stacking solder-coated welded core tubes in a plurality of spaced sets of a plurality of spaced tubes each with serpentine fins arranged between each adjacent pair of tube sets;
   (b) arranging end rigid support plates against each of the end tube sets to provide a stack;
   (c) applying compression to the resulting stack through said support plates, the tubes having substantially coplanar ends projecting beyond the sides of the stack;
   (d) banding said stack into an easily handled rigid assembly by applying a plurality of spaced, taut tie bands around the support plates and encircling said stack;
   (e) applying a header plate to each side of the assembly with said tube ends extending through corresponding holes in the header plates;
   (f) gang welding said projecting ends to the exterior of said header plates by means of a movable, multi-head, automatic welder;
   (g) dipping the resulting core assembly into a liquid soldering flux;
   (h) blowing heated air at a temperature above the melting point of said solder over the outer surfaces of said core assembly to bond the fins and tubes together;
   (i) blowing a flowing mixture of solder and flux over the adjacent junction areas of the tubes and header plates that are opposite to the location of said welds, the welds thereby being on the liquid side of the heat exchanger and the solder mixture on the air side;
   (j) heating said adjacent areas of the tubes and header plates to melt said solder mixture and thereby coat the said adjacent areas of the tubes and header plates with solder to seal the air side of the welds at said adjacent areas against any leakage opening that may occur in the welds;
   (k) removing said end support plates and spaced bands from said core; and
   (l) attaching a tube enclosing liquid tank to each of said header plates in fluid tight relation.

2. The method of claim 1 wherein each said tube receiving hole in the header plates is defined by an outwardly projecting flange relative to said core that overlies the projecting ends of the tubes.

3. The method of claim 2 wherein each flange and corresponding tube end have substantially coplanar end surfaces with the welds being essentially located at the coplanar ends.

4. The method of claim 1 wherein said core tubes are arranged in spaced sets with the serpentine fins inserted between each adjacent pair of tube sets, said sets being generally parallel to each other and generally perpendicular to the header plates.

5. The method of claim 1 wherein said compression that is applied to the said stack is sufficient to retain the contacting surfaces of support plates, tubes and fins in intimate contact with each other throughout steps (a)–(j) of said making of the heat exchanger, said intimate contact being maintained by said taut tie bands.

6. The method of claim 1 wherein said assembly is held in position with the one ends of tubes projecting upwardly during the welding of the one set of tube ends of the header flanges and the assembly is then rotated to arrange the other ends of the tubes upwardly for the welding of these ends to their header plate.

7. The method of claim 1 wherein said solder mixture is blown along the air side of each header.

8. The method of claim 1 wherein said stacking of the tubes, serpentine fin spacers and end support plates is in an assembly fixture having confronting surfaces intersected by vertically spaced grooves in which the ends of the sets of tubes are held and between whose confronting surfaces the fin spacers are located.

* * * * *